(12) United States Patent
Dron et al.

(10) Patent No.: US 9,556,744 B2
(45) Date of Patent: Jan. 31, 2017

(54) TURBOMACHINE WITH FAN(S) FOR AIRCRAFT, WITH MOBILE JET NOZZLE

(75) Inventors: Sebastien Dron, Cachan (FR); Nicolas Jerome Jean Tantot, Paris (FR)

(73) Assignee: SNECMA, Paris (FR)

( * ) Notice: Subject to any disclaimer, the term of this patent is extended or adjusted under 35 U.S.C. 154(b) by 608 days.

(21) Appl. No.: 14/004,713

(22) PCT Filed: Mar. 14, 2012

(86) PCT No.: PCT/FR2012/050537
§ 371 (c)(1),
(2), (4) Date: Sep. 12, 2013

(87) PCT Pub. No.: WO2012/123681
PCT Pub. Date: Sep. 20, 2012

(65) Prior Publication Data
US 2014/0003916 A1    Jan. 2, 2014

(30) Foreign Application Priority Data

Mar. 14, 2011    (FR) ...................................... 11 52064

(51) Int. Cl.
*F02K 1/09*    (2006.01)
*F01D 9/02*    (2006.01)
(Continued)

(52) U.S. Cl.
CPC . *F01D 9/02* (2013.01); *F02K 1/09* (2013.01); *F02K 1/763* (2013.01); *F02K 3/025* (2013.01);
(Continued)

(58) Field of Classification Search
CPC ............ F01D 9/02; F02K 3/075; F02K 1/763;
F02K 3/025; F02K 1/09; F02K 3/072; Y02T 50/66; F05D 2300/505; B64D 2027/005
(Continued)

(56) References Cited

U.S. PATENT DOCUMENTS

| 2,418,488 A | * | 4/1947 | Thompson | ................ F02K 1/09 |
| | | | | 239/265.25 |
| 2,478,206 A | * | 8/1949 | Redding | ................ B64C 11/001 |
| | | | | 60/226.1 |

(Continued)

FOREIGN PATENT DOCUMENTS

| FR | 2 944 774 | | 10/2010 | | |
| GB | 612414 A | * | 11/1948 | ................ | F02C 7/04 |
| GB | 784408 A | * | 10/1957 | ................ | F02K 1/16 |

OTHER PUBLICATIONS

International Search Report Issued May 16, 2012 in PCT/FR12/50537 filed Mar. 14, 2012.

*Primary Examiner* — Ted Kim
(74) *Attorney, Agent, or Firm* — Oblon, McClelland, Maier & Neustadt, L.L.P.

(57) ABSTRACT

A turbomachine for an aircraft including at least one turbine driving rotation of a fan, and a jet nozzle coaxially extending a turbine and creating, with an outlet cone that terminates the turbine, a passage of annular cross section for combustion gases that pass through the turbine. The jet nozzle can be mounted so that it can move between two extreme positions for which under action of a controller, an annular cross section of the passage for the gases is respectively at its minimum or maximum, making it possible to vary the cross section according to phases of operation of the aircraft and distribute thrust between the fan and the jet nozzle.

6 Claims, 2 Drawing Sheets

(51) Int. Cl.
*F02K 1/76* (2006.01)
*F02K 3/02* (2006.01)
*F02K 3/072* (2006.01)
*F02K 3/075* (2006.01)
*B64D 27/00* (2006.01)

(52) U.S. Cl.
CPC .............. *F02K 3/072* (2013.01); *F02K 3/075* (2013.01); *B64D 2027/005* (2013.01); *F05D 2300/505* (2013.01); *Y02T 50/66* (2013.01)

(58) Field of Classification Search
USPC .......................................... 60/232, 771, 268
See application file for complete search history.

(56) References Cited

U.S. PATENT DOCUMENTS

| | | | |
|---|---|---|---|
| 2,537,772 A | 1/1951 | Lundquist et al. | |
| 2,653,445 A * | 9/1953 | Halford | F02K 1/09 239/265.27 |
| 3,484,847 A * | 12/1969 | Poole | F02K 1/09 181/215 |
| 3,670,964 A * | 6/1972 | Pedersen | F02K 7/16 239/265.19 |
| 3,820,719 A * | 6/1974 | Clark | F02K 1/66 239/265.31 |
| 4,446,696 A | 5/1984 | Sargisson et al. | |
| 4,527,388 A * | 7/1985 | Wallace, Jr. | F02K 1/08 239/265.19 |
| 4,802,629 A * | 2/1989 | Klees | F02K 1/085 239/265.19 |
| 5,211,008 A * | 5/1993 | Fage | F02K 1/74 239/265.19 |
| 5,224,831 A * | 7/1993 | Hermans | B64C 11/06 416/129 |
| 8,245,516 B2 * | 8/2012 | Song | F02K 1/06 239/265.19 |
| 2010/0186418 A1* | 7/2010 | Beutin | F01D 15/10 60/802 |
| 2011/0286842 A1* | 11/2011 | Danielson | B64C 11/306 416/1 |

* cited by examiner

TURBOMACHINE WITH FAN(S) FOR AIRCRAFT, WITH MOBILE JET NOZZLE

The present invention relates to turbomachines having one or more propellers for aircraft.

More specifically, although not exclusively, the turbomachines to which the invention relates can be of any type provided that they comprise at least one propeller, for example an unducted fan having two contrarotating propellers, also called an "open rotor", or a turboprop having one or more propellers, or similar.

Conventionally, turbomachines having propellers for aircraft produce their overall thrust through the combination of the traction produced by the propellers and the thrust delivered by the nozzle of the gas generator or turbine, making use of the expansion of the combustion gases. The majority (at least 80%) of the overall thrust is provided by the propellers, and the remainder (less than 20%) by the expansion of the combustion gases flowing through the nozzle.

The distribution, in these turbomachines, of the overall thrust between the propellers and the combustion gases is governed in particular by the cross section of the nozzle of the gas generator, and is of course determined beforehand in order to find the most suitable compromise between the various functional phases encountered by the aircraft (takeoff, climb/descent, cruise, taxi) and to obtain acceptable efficiency and fuel burn for the turbomachines, and to reduce the noise impact produced by the turbomachines, in particular by the propellers thereof.

However, given that this is a compromise, it is obvious that the above points are not optimized for every one of the functional phases of the aircraft. Indeed, it would for example be desirable, in the takeoff and initial climb stage, to be able to reduce the noise impact on the propellers by reducing their thrust contribution and, accordingly, increasing the thrust contribution from the expansion of the combustion gases in the nozzle. Conversely, in the cruise phase, it would be useful to increase the thrust contribution of the propellers (without increasing their rotational speed) in order to take full advantage of their high propulsive efficiency, and to reduce the thrust contribution from the expansion of the gases, the propulsive efficiency of which is lower.

The present invention aims to provide a solution to these drawbacks and relates to a turbomachine having one or more propellers, the design of which allows the operation of the propeller or propellers and of the nozzle to be adapted to the various flight phases of the aircraft.

To that end, the turbomachine having one or more propellers for aircraft, of the type comprising at least one turbine designed for driving the propeller in rotation, and a nozzle which extends coaxially beyond said turbine, creating, with an exhaust cone which terminates the turbine, a passage of annular cross section for the combustion gases flowing through the turbine, is noteworthy for the fact that the nozzle is mounted so as to be able to move between two end positions at which the annular cross section of the passage is respectively at a minimum or a maximum, and that control means are attached to the nozzle in order to change the position thereof and to vary the cross section of the passage for the combustion gases depending on the functional phases of the aircraft.

Thus, by virtue of the invention, by varying the outlet cross section of the nozzle which is now moveable, it is possible to change the thrust distribution between the propeller(s) and the nozzle depending on the phases of the aircraft, this being impossible with current turbomachines having propellers, the nozzle cross section of which is immobile.

For example, it will be possible, for the takeoff phase, to prefer an increase in the thrust contribution produced by the nozzle in order to decrease the load on the propellers and the turbine, thus improving efficiency and reducing the noise impact on the ground due to the propeller blades then being under less aerodynamic stress. To that end, the nozzle is in an end position in which the annular cross section of the passage for the gases is at a minimum. Indeed, when the nozzle cross section is small, the possible expansion (gas pressure) in the power turbine driving the propellers is reduced, such that the thrust provided by the propellers decreases with the result that less noise pollution is produced, whereas the expansion through the nozzle increases.

For the climb and cruise phases, by contrast, it will be possible to prefer, using an end position of the nozzle in which the annular cross section of the passage for the gases is at a maximum, an increase in the thrust contribution from the propellers (all the more so as their propulsive efficiency is excellent in the cruise phase) and minimum thrust through the nozzle (the efficiency of which is substantially lower) so as to optimize the thermopropulsive efficiency of the turbomachine.

Any intermediate position between the two end positions is of course conceivable.

The control means are preferably actuators or similar connecting a portion of a peripheral nacelle, which surrounds the turbine, to the nozzle. In this case, the control actuators are advantageously arranged distributed at regular angular intervals around the nozzle and parallel to the longitudinal axis of the turbomachine in order to move the nozzle in translation between its end positions with respect to the nacelle and with respect to the exhaust cone of the turbine which converges toward said axis.

It is thus understood that the cross section is varied as a result of the nozzle moving in translation, due to the convergence of the cone which is immobile in the axial direction, increasing or reducing the annular cross section of the passage depending on the sliding movement of the nozzle.

In one embodiment, when the nozzle moves in translation between its end positions, the cylindrical wall of the nozzle remains in contact with the cylindrical wall of the nacelle. Thus, even in the retracted end position, the nozzle extends beyond the nacelle, with the annular cross section of the passage for the combustion gases at a maximum.

In another embodiment, when the nozzle moves in translation from its end position of minimum passage cross section to its end position of maximum passage cross section, an annular opening is created between the nacelle and the nozzle. The nozzle is then distant from the nacelle such that the lateral opening created helps to increase the maximum annular cross section, by adding to the latter.

Furthermore, in one embodiment, the control means of the nozzle are made of a shape-memory material having two stable states depending on the temperature, corresponding substantially to the end positions of the nozzle at which the passage cross section is at a minimum or a maximum. Thus, as will be seen later on, the cross section of the passage is varied spontaneously as a result of the temperature rising or falling.

How the invention can be produced will be easily understood with reference to the figures of the appended drawing. In these figures, identical references designate similar elements.

Figure 1:
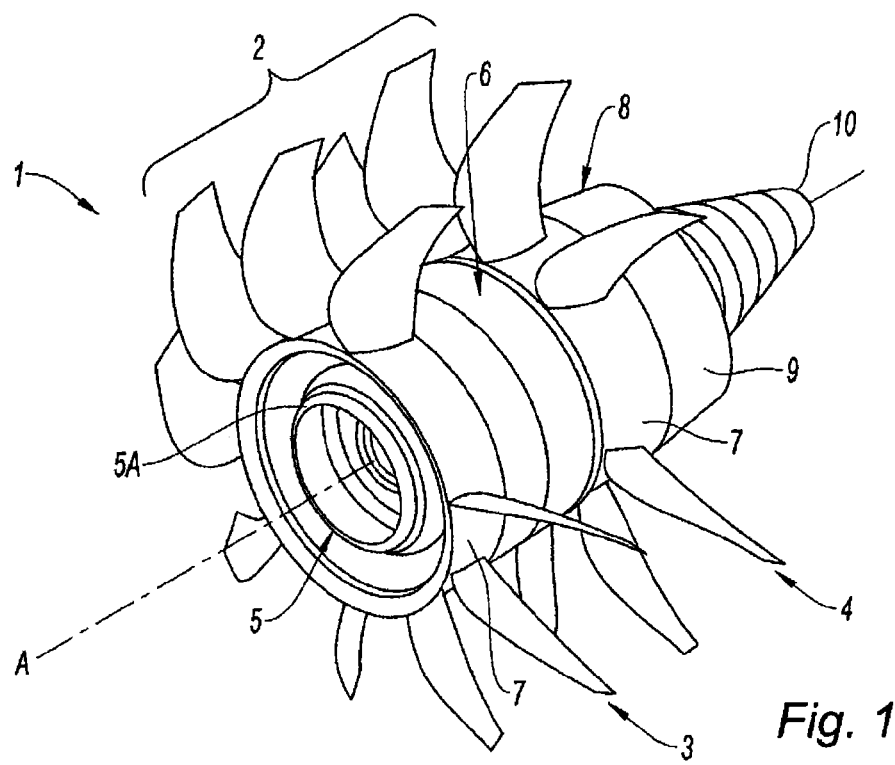
FIG. 1 shows, schematically and in perspective, the rear of a turbomachine having propellers, of the "open rotor" type.

The turbomachine 1 shown in part in FIG. 1 is a turbomachine having an unducted fan 2, also known as an "open rotor", which comprises two rear coaxial and contrarotating propellers, respectively upstream 3 and downstream 4 with respect to the longitudinal axis A of the turbomachine.

Forward of the fan 2, the turbomachine 1 comprises, as is conventional and in the direction of the flow of gases, a gas generator assembly consisting of compressors, a combustor, and turbines which are physically connected to the compressors, a power turbine 5 such as two successive low pressure turbines respectively connected, in rotation and in contrarotating fashion, to the upstream propeller 3 and downstream propeller 4.

Figure 2:
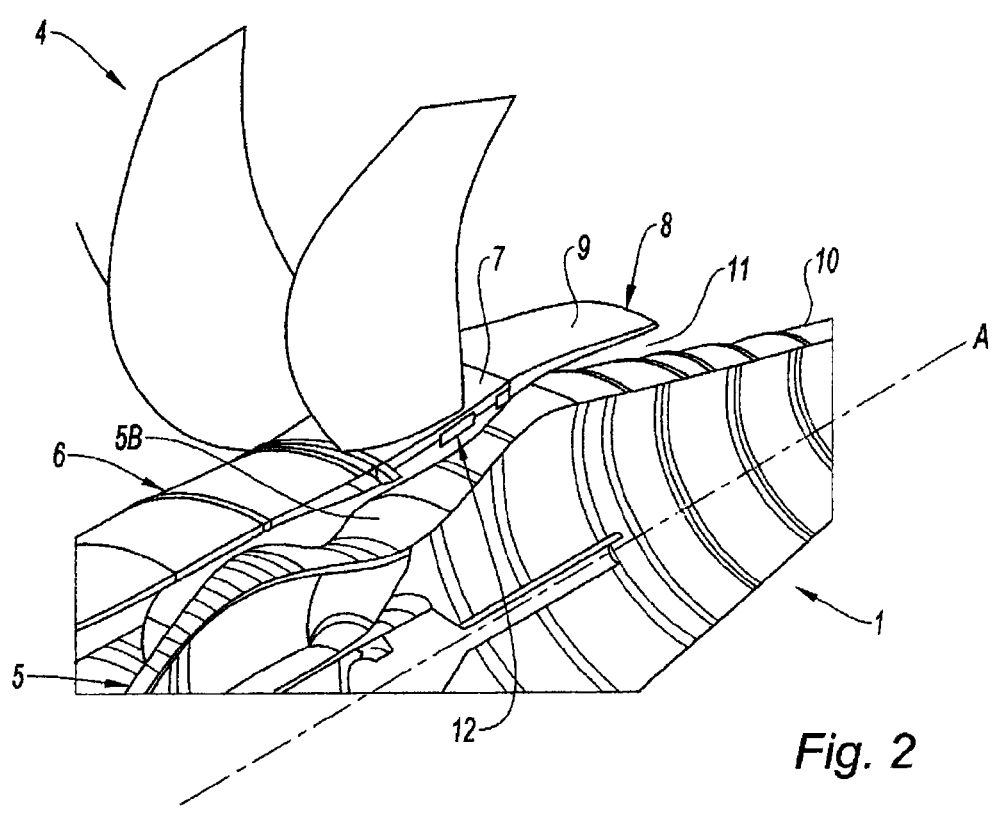
FIG. 2 is a partial cutaway view, in perspective and enlarged, of the turbomachine shown in FIG. 1 having the controllable exhaust nozzle.

FIG. 1 shows, in part and schematically, the low pressure turbine 5A which is secured in rotation with the propeller 3, and FIG. 2 shows the other low pressure turbine 5B which is secured in rotation with the propeller 4. These contrarotating propellers extend in the radial direction outside respective cylindrical (and thus rotating) portions 7 of a cylindrical nacelle 6 of the turbomachine.

And, extending axially beyond the portion 7 bearing the downstream propeller 4, there is an exhaust nozzle 8 having a cylindrical wall 9, which is connected in rotation to the portion 7 of the downstream propeller 4 of the nacelle, and concentrically surrounds the rear of the power turbine 5 (low pressure turbine 5B) which terminates in an exhaust cone 10 which is secured in rotation to the turbine and converges toward the longitudinal axis A of the turbomachine 1. The passage 11 of annular cross section is then created between the nozzle 8 and the turbine 5 having the exhaust cone 10, and the combustion gases from the combustor, which circulate in the various high pressure and low pressure turbines, flow through this passage.

As stated previously, these combustion gases contribute to the overall thrust supplied by the turbomachine 1, the majority of which is supplied by the contrarotating propellers 3, 4 which are driven by the power turbine 5.

In accordance with the invention, in order to be able to distribute the thrust between the propellers 3, 4 and the nozzle 8 depending on the functional phases of the aircraft, the annular cross section of the passage 11 for the gases can be varied by virtue of the capacity of the nozzle 8 to move in a controllable manner. Of course, the thrust is distributed within relatively small predetermined and tested ranges, and the main thrust is still predominantly provided by the propellers.

Figure 3:
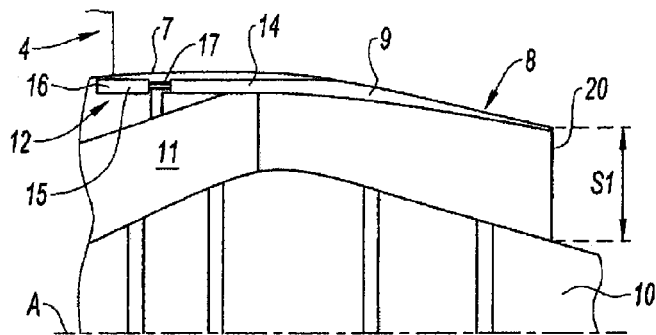
FIGS. 3 and 4 show, in part and in longitudinal section, according to one exemplary embodiment, the respective minimum and maximum positions of the nozzle which allow the cross section of the passage for the combustion gases to be varied.

As shown in more detail in FIGS. 2 and 3, the rotating nozzle 8 is mounted so as to be able to move axially, along axis A, between two predetermined end positions, making it possible to obtain, using control means 12 provided between the nacelle 6 and the nozzle 8, two cross sections of the passage for the gases, labeled minimum S1 and maximum S2. More specifically, the cylindrical wall 9 of the nozzle, which coaxially extends the nacelle, has a forward cylindrical portion 14 which engages telescopically inside the cylindrical portion 7, underneath the latter until it is in abutment in order that the outer profile of the cylindrical portion 7 of the nacelle 6 and the outer profile of the nozzle 8 are continuous.

In order to allow the nozzle 8 to slide with respect to the cylindrical portion 7, connected to the downstream propeller 4, of the nacelle 6 and, as will be seen, to increase the annular cross section of the passage for the gases, the control means 12 are actuators 15 which are arranged parallel to each other and to the longitudinal axis A, and which are arranged distributed at regular angular intervals with respect to said axis A of the turbomachine. These actuators 15 are, for example, fluidic (hydraulic or pneumatic) actuators, or they may be electric actuators, and the cylinders 16 of each of them are articulated to the cylindrical portion 7 of the nacelle 6 while the rods 17 are articulated to the forward cylindrical portion 14 of the wall 9 of the nozzle 8.

As shown in FIG. 3, the actuators 15 are in this embodiment in the retracted position, such that the forward cylindrical portion 14 of the wall 9 of the rotating nozzle 8 is telescopically engaged as far as possible in the rotating cylindrical portion 7 of the nacelle 6. In this end position of the nozzle 8, the annular cross section S1 of the passage 11 for the gases, when considered perpendicular to the longitudinal axis, between the trailing edge 20 of the nozzle and the rotating convergent cone 10 at this point is then considered to be at a minimum.

In this case, when the cross section S1 of the passage 11 of the gases at the nozzle outlet is at a minimum, the expansion possible from the pressurized gases in the power turbine 5 driving the propellers 3, is reduced and, therefore, the thrust from the propellers decreases, whereas the expansion in the nozzle 8 increases. As a consequence, such a position of the nozzle 8 with a minimum cross section S1 of the passage for the gases is well suited to the takeoff phase of airplanes fitted with these turbomachines having propellers. This is because, by increasing the thrust contribution generated by the nozzle, the thrust contribution provided by the propellers is reduced, such that these are under less load, thus reducing noise impact as the jet of combustion gases is considered to be quieter than the propellers. This approach also reduces fuel burn during this takeoff phase.

Figure 4:
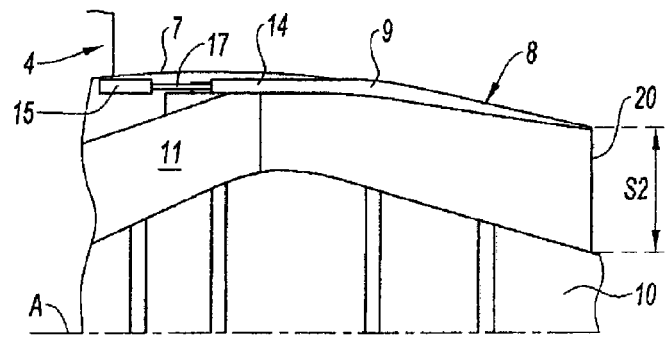

As shown now in FIG. 4, the control actuators 15 are actuated in order to assume their extended position, such that the rotating nozzle 8, via its cylindrical portion 14, "slides" rearward, parallel to the axis A of the turbomachine, moving backward with respect to the cylindrical portion 7 of the nacelle 6. In this second end position of the nozzle, the annular cross section S2 of the passage for the gases, considered at the rear edge 20 of the nozzle and perpendicular to the axis, is then at a maximum and greater than S1 as the rotating exhaust cone 10 of the turbine 5B converges toward the axis A. As the nozzle 8 has moved axially backward with respect to the exhaust cone 10 which is immobile in the axial direction, the cross section S2 of the passage 11 for the gases is enlarged.

In this case, when the cross section of the passage for the gases at the nozzle outlet is at a maximum, more power from the turbine 5 is provided to the propellers 3, 4 and less energy is available in the nozzle 8 as the expansion of the gases therein is reduced.

Consequently, such a position of the nozzle with maximum cross section S2 of the passage for the gases is particularly well suited to the flight phases climb and cruise, wherein maximum thrust from the propellers (the propulsive efficiency of which is excellent) and minimum thrust from the primary nozzle (the efficiency of which is substantially lower) are required, so as to maximize the thermopropulsive efficiency of the turbomachine 1.

Finally, by virtue of the nozzle 8, which is moveable in the axial direction and has a variable cross section of the passage for the gases, it is possible to distribute in optimum fashion the power between the propellers 3, 4 and the nozzle 8 in order to reduce, in particular, noise pollution on takeoff (by favoring the nozzle) and fuel burn in the cruise phase (by favoring the propellers).

By way of information, with minimum nozzle cross section (climb, cruise), 7% of total thrust is provided by the gas jet whereas, with maximum nozzle cross section, 10% of thrust is provided by the gas jet, the remainder in each case being supplied by the propellers.

This distribution of power in open rotors or turboprops, although within limited ranges, makes it possible to achieve gains in terms of noise and fuel burn, and equally to limit the stresses on the propellers, in particular at takeoff.

Figure 5:
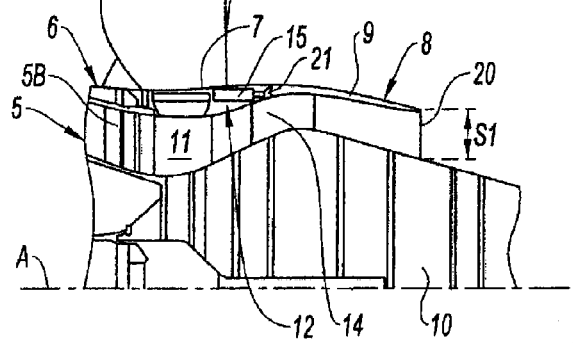
FIGS. 5 and 6 show, in part and in longitudinal section, a variant of the embodiment of FIGS. 3 and 4.
Figure 6:
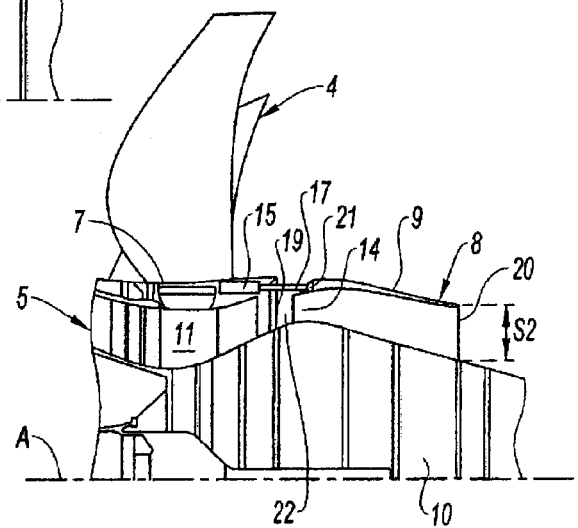

The embodiment variant shown in FIGS. 5 and 6 for changing the cross section of the passage 11 for the combustion gases is close to the preceding embodiment.

Control actuators 15—which are also axial—move the rotating nozzle 8 in the axial direction between its two end positions depending on the functional phases of the turbomachine 1. However, in contrast to the embodiment described, the forward portion 14 of the nozzle 8 does not engage as deeply in the corresponding rotating cylindrical portion 7 of the nacelle 6, such that, when the actuators 15 are actuated in order to move from their retracted position to their extended position, the forward edge 21 of the nozzle 8 moves parallel to the axis A away from the rear edge 19 which terminates the cylindrical portion 7 of the nacelle 6, and creates between them a lateral cylindrical opening 22.

Thus, as shown in FIG. 6, this opening 22 increases the ejection cross section in addition to the cross section S2 at the nozzle outlet so as to achieve, by these variations in cross sections, a suitable distribution of thrust between the propellers and the nozzle.

In one embodiment variant which is not shown, in order to vary the annular cross section of the passage 11 for the combustion gases, by moving the nozzle 8 in the axial direction, it is conceivable to use shape-memory materials.

Indeed, materials such as shape-memory metallic alloys are known to have the property of having, in the solid state, two stable crystalline structures (one in the austenitic phase, the other in the martensitic phase) each in one of two different temperature ranges which each correspond to a specific phase of the crystalline structure of the alloy and which are separated by an intermediate region known as the transition temperature. Thus, depending on the temperature, the part made of such an alloy may take on two different stable configurations in a reversible manner. By way of example, these alloys are nickel-titanium alloys or copper-zinc-aluminum alloys, depending on the applications.

For example, by arranging such a part, which is not shown, between the nacelle and the rotating nozzle, it is possible to move the latter in the axial direction, depending on the temperature, and vary the annular outlet cross section of the nozzle. Such a part thus acts as a "muscle" in place of the actuators.

As a variant, it would also be possible to attach the shape-memory part directly onto the wall of the nozzle, or even to integrate it into the nozzle itself in order to vary the ejection cross section.

It should be remembered that a variable cross section nozzle of the type described hereinabove, in combination with an open rotor, can also be mounted on turboprops or other turbomachines having propellers.

The invention claimed is:

1. A turbomachine including at least one propeller for an aircraft, comprising:
   at least one turbine to drive the propeller in rotation;
   a nozzle extending beyond a portion of a nacelle of said propeller and connected in rotation to said portion of said propeller, said nozzle extending coaxially beyond the turbine, creating, with an exhaust cone that terminates the turbine, a passage of annular cross section for combustion gases flowing through the turbine, the nozzle being mounted to be able to move between two end positions at which the annular cross section of the passage is respectively at a minimum or a maximum; and
   a controller attached to the nozzle to change a position thereof and to vary the cross section of the passage for the combustion gases depending on functional phases of the aircraft;
   wherein, to vary the cross section of the passage for the combustion gases, the nozzle moves, under action of the controller, in translation parallel to a longitudinal axis of the turbomachine toward which the exhaust cone of the turbine converges.

2. The turbomachine as claimed in claim 1, wherein the controller includes actuators connecting a portion of a peripheral nacelle, which surrounds the turbine, to the nozzle.

3. The turbomachine as claimed in claim 2, wherein the control actuators are arranged distributed at regular angular intervals around the nozzle, parallel to the longitudinal axis of the turbomachine.

4. The turbomachine as claimed in claim 2, wherein, when the nozzle moves in translation between the end positions, a cylindrical wall of the nozzle remains in contact with a cylindrical wall of the nacelle.

5. The turbomachine as claimed in claim 2, wherein, when the nozzle moves in translation from the end position of a minimum passage cross section to the end position of a maximum passage cross section, an annular opening is created between the nacelle and the nozzle.

6. The turbomachine as claimed in claim 1, wherein the controller of the nozzle includes a shape-memory material having two stable states depending on temperature, corresponding to the end positions of the nozzle at which the passage cross section is at the minimum or the maximum.

* * * * *